Jan. 27, 1942.  E. B. CRAWFORD  2,271,159
TUBE COUPLING
Filed May 13, 1940
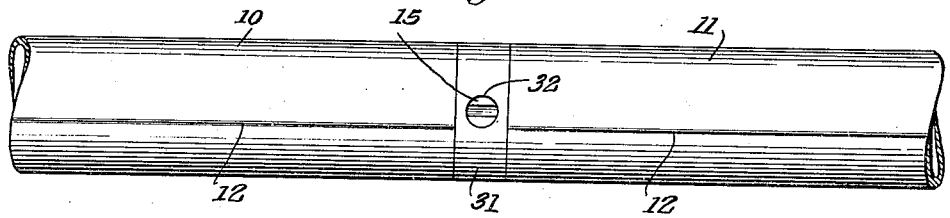
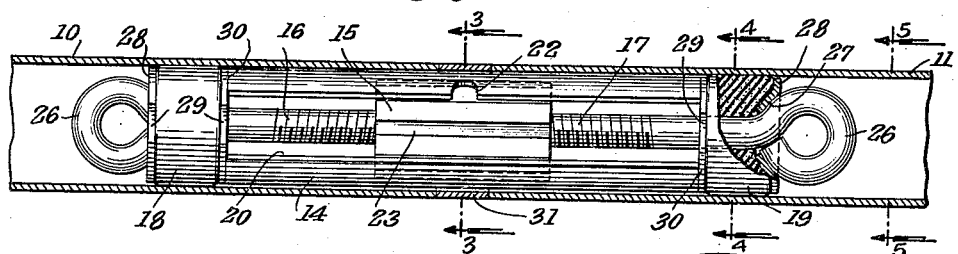
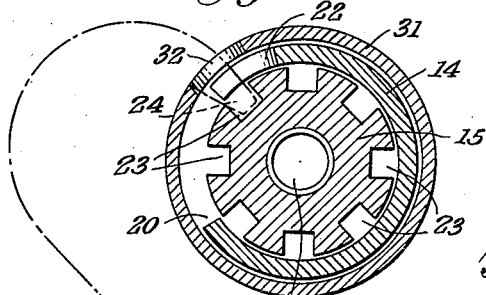
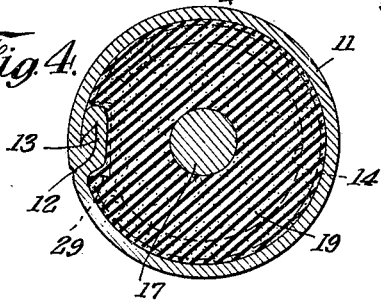
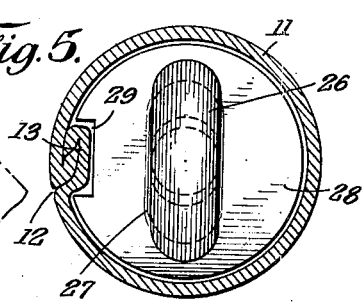
INVENTOR
EMERICK B. CRAWFORD
BY
ATTORNEYS Patented Jan. 27, 1942

2,271,159

UNITED STATES PATENT OFFICE 2,271,159

TUBE COUPLING

Emerick Brewster Crawford, Hamden, Conn., assignor to H. L. Judd Company, Inc., Wallingford, Conn., a corporation of Delaware Application May 13, 1940, Serial No. 334,714

6 Claims. (Cl. 287—127)

My invention relates to couplings for tubes or pipes.

In certain installations as, for instance, rails for hospital cubicles, shower curtains, etc., lengths of tubing are coupled to provide a track for hooks, rings, rollers, or other forms of trolleys carrying curtains and the like. In order that there may be free movement of the trolleys along the rails, the joints between sections of the tubing making up the rail, should be free of projections and be smooth and uninterrupted. Installations of the character indicated are disclosed in the patent to C. P. Day, No. 2,008,579, patented July 16, 1935. It is now common practice, as shown in that patent, to employ set-screws and like means for coupling adjacent tube ends. Set-screws and the like, because of the light gauge of the tube walls, may provide an insecure joint, and there is always danger that the set-screws may become loosened. Loosening of the set-screws not only weakens the coupling but presents projections which may interfere with the smooth movement of the trolleys.

It is a general object of the invention to provide a coupling for tubes or pipes which will present a smooth, uninterrupted, projectionless union at the juncture of two tubular members, or at the juncture of a tubular member and a terminal or other fitting therefor.

Another object of the invention is to provide a flush coupling for tubes which will offer high resistance to separation of coupled tubes and which will also maintain a true alignment of said tubes.

Another object is to provide a coupling which is quickly and easily assembled and as easily disassembled without the necessity of axial rotation of either of the coupled members.

A still further object is to provide tube coupling means which, when applied to adjoining tube ends for coupling the same, draws said ends toward each other to provide a desired tight joint.

The foregoing and other objects, features, and advantages of the invention will be more clearly pointed out or will be apparent from the following detailed specification.

Briefly stated, the invention in its preferred form contemplates the provision of a coupling including expansible means in the end of a tube or the ends of adjoining tubes, and with means such as a nut, operable from the outside, for acting on said expansible means to cause the latter to firmly grip the tube or tubes and preferably to simultaneously draw the tube ends towards each other to provide a secure joint.

In the drawing, in which is illustrated a preferred form of the invention—

Fig. 1 is an elevational view showing the ends of two tubes coupled in the manner contemplated herein;

Fig. 2 is a longitudinal sectional view thereof showing the coupling means employed in Fig. 1;

Figs. 3, 4 and 5 are cross-sectional views, on an enlarged scale, as taken in the planes of the respective lines 3—3, 4—4, and 5—5, in Fig. 2; Fig. 3 also showing a tool employed for tightening or loosening the coupling means.

In that preferred form of the invention which is illustrated, the tubes 10 and 11 are to be coupled in the manner herein disclosed. These tubes may be seamless but in the present instance each has a seam 12 formed at the interlocking and overlapping lateral edges of the sheet from which said tube is formed. These latter tube portions provide an inwardly projecting key-like portion or rib 13, which may serve a purpose as later set forth.

The coupling means for the adjacent ends of the tubes 10 and 11 may comprise a coupling sleeve 14, an operating nut 15, the oppositely threaded screws 16 and 17 engaged with said nut in the manner of a turnbuckle, and the expansible members 18 and 19 associated with the respective screws 16 and 17 and held in spaced relation by the sleeve 14.

The sleeve 14 may be provided with an opening or slot in its side and at substantially the middle thereof, but it is preferred to provide said sleeve with a slot 20 extending longitudinally so that this member may be inexpensively formed of sheet stock rolled into the desired shape. The slot 20 may be of suitable width to enable proper manipulation of the nut 15 by a tool such as a wrench 21, but, as illustrated, suitable operating space for the tool may be provided by notching the sleeve as at 22.

The nut 15 is preferably provided with spanner slots 23 for engagement by the tooth 24 of the tool 21, although other tool engaging recesses may be provided for this purpose in place of the slots 23. The nut is axially bored as at 25, the opposed ends of the bore being reversely tapped for threaded engagement with the reversely threaded screws 16 and 17. It is evident that rotation of the nut 15 by the spanner tool 21 will cause opposed endwise movement of the screws 16 and 17, said movement being outward for one direction of rotation of said nut and inward for the other.

In order to obtain the above described movement of the screws, they must be held against axial rotation. For that purpose the screws 16 and 17 are each formed with a portion such as the eye 26 and these eyes are preferably engaged in oval seats 27 formed in washers 28 disposed against the outer surfaces of the respective members 18 and 19. The washers 28, in turn, are notched as at 29 for engagement with the key projections 13 of the tubes 10 and 11. In this manner, rotation of the nut 15 can only impart axial movement to the screws 16 and 17.

The members 18 and 19 are preferably formed as axially bored cylindrical plugs of rubber or like resilient material which, when compressed axially, will expand peripherally to tightly engage the inner walls of the tubes 10 and 11. In the present device this expansion is obtained by drawing the screws 16 and 17 inwardly so the eyes 26 thereof cause similar inward movement of the washers 28. These, in turn, compress the members 18 and 19 against the washers 30 disposed between the ends of the coupling and spacing tube 14 and said members 18 and 19. This endwise compression of the rubber members causes the mentioned peripheral expansion thereof. The washers 30 may also be notched for engagement with the keys 13 of the tubes 10 and 11.

So that access may be had to the spanner slots 23 at all times for desired manipulation of the nut 15, means such as the ring 31 may be provided between the adjacent ends of the tubes 10 and 11, said ring being provided with an opening 32 whereby the tooth 24 of the spanner tool may be engaged with said spanner slots 23.

The tube 14, the washers 28 and 30, and the expansible members 18 and 19 are preferably of such diameter as to be easily insertable into the tubes 10 and 11, the coupling not depending for successful operation upon a tight fit of said parts before expansion of the members 18 and 19. A slip fit of these parts in the tubes is preferable and ample for the purposes of the invention.

It will be noted from the foregoing that the coupling is of unitary design which makes for ease of handling and that many parts are duplicates of each other so that the cost of manufacture will be low. It will also be noted that the tubes 10 and 11 are free of holes, taps, or outer projections to further reduce the cost of manufacture and to give the desired flush coupling construction.

When it is desired to couple the tubes 10 and 11, one end of the coupling is inserted into the tube 10 and the other into the tube 11. In order to insure a full stroke of the tool for suitably rapid rotation of the nut 15 and for centering the ring on the coupling, the tooth 24 of the tool is first inserted through the ring opening 32 and engaged in the notch 22 of the spacing sleeve 14. The ends of the tubes 10 and 11 are then slipped over the coupling and into contact with said ring.

The spanner tool tooth 24 is engaged in the slot 23 which is exposed by the opening 32 and the nut rotated in the direction of the arrow (Fig. 3) until the rotation of said tool is stopped by the sleeve 14. The tool is then withdrawn and the operation repeated. This rotation of the nut 15 draws the screws 16 and 17 towards each other to cause the mentioned expansion peripherally of the members 18 and 19. As the screws move inwardly, they move the outer ends of said members 18 and 19 axially towards each other and because of the firm contact of said members with the inner walls of the tubes, this axial movement tends to crowd the tube ends into intimate contact with the ring 31. When the members 18 and 19 have been expanded in the tubes to a sufficient extent, the coupling will resist both axial and bending forces which may tend to separate or misalign the tubes. Reverse movement of the spanner tool, to cause separation of the screws 16 and 17, will loosen the coupling when it is desired to disassemble the parts.

The coupling may be used with seamless tubing, when there is a reasonably tight fit of the members 18 and 19 in the tubes, or if other means be provided for holding the screws against rotation. The frictional engagement of the members 18 and 19 with said tubes will hold the screws 16 and 17 against rotation while the nut 15 is being turned as the coupling is applied.

From the foregoing it is evident that a simple and highly efficient coupling for the purpose intended has been provided.

It will be clear that the invention is not limited to use with round tubing, but may be used with tubing of oval or other section. The coupling may be employed for coupling tubing to a bracket or other fitting. Inasmuch as skilled persons may practice the invention within the spirit and scope thereof as claimed, I do not wish to be limited to the specific details of this disclosure which is intended by way of example only.

I claim:

1. A coupling for tubes and the like including a rotatable member, reversely threaded elements engaged with said rotatable member for opposed axial movement by said rotatable member, axially compressible and peripherally expandable plugs carried by said elements and having non-rotational engagement therewith, and a member disposed between said plugs for receiving endwise thrust imparted to said plugs by said threaded elements whereby said plugs are compressed axially and expanded peripherally into the tubes within which they are disposed.

2. A coupling for tubes and the like having keying means therewithin, including a rotatable member operable between adjacent ends of said tubes, reversely threaded elements threadably engaged with said member, plugs operable by said elements, spacing means between said plugs, and means keyed to said elements and having keying engagement with the keying means of the tubes whereby rotation of said rotatable member in one direction will move said threaded elements axially to compress said plugs against said spacing means to expand them peripherally into tight engagement with the inner walls of said tubes.

3. A coupling for tubes and the like including a rotatable nut formed with spanner slots, a pair of reversely threaded screw elements threadably engaged with said nut, a plug operable by each screw element and disposed within the tubes to be coupled, means for keying each plug to its respective screw element, a spacer member between said plugs, and having an opening for access of a tool to the slots of said nut whereby the same may be rotated, and means for keying said plugs to the tubes within which they are disposed whereby the mentioned rotation of the nut will impart axial movement to the screw members to compress said plugs against said spacer member to cause peripheral expansion of said plugs into tight fitting engagement with said tubes.

4. A coupling for tubes including an elongated rotatable nut reversely threaded at opposite ends, reversely threaded screw elements engaged within the respective threads in said nut for opposed axial movement by the rotation of said nut, axially compressible and peripherally expansible plugs non-rotatably mounted on the ends of said screw elements, a single spacer member disposed between said plugs for receiving endwise thrust imparted to said plugs, said spacer member being slotted at one side to afford access to said nut, and a ring outside said spacer member to space the tube ends to be united, said ring having a tool passage, for the purpose described.

5. A coupling for tubes comprising a nut having reversely threaded ends, reversely threaded screw elements engaged within said threads respectively, compressible and expansible plugs nonrotatably mounted on the outer ends of said screws, means to prevent said plugs from rotating within said tubes, a spacing sleeve between said plugs to take the thrust thereof as said nut is turned to draw said screws toward each other, a clearance slot in the side of said spacer tube for tool access to said nut, a ring outside said sleeve to act as an abutment for the ends of the tubes to be connected, said ring having a tool passage outside the slot in said sleeve, whereby tool access may be gained through said ring and sleeve to said nut.

6. A coupling for tubes including an elongated rotatable nut reversely threaded at opposite ends, reversely threaded screw elements engaged within the respective threads in said nut for opposed axial movement by the rotation of said nut, axially compressible and peripherally expansible plugs non-rotatably mounted on the ends of said screw elements, spacer means disposed between said plugs for receiving endwise thrust imparted to said plugs, and a ring outside said spacer member to space the tube ends to be united, said ring having a tool passage, for the purpose described.

EMERICK BREWSTER CRAWFORD.